United States Patent [19]
Ijuin et al.

[11] Patent Number: 5,325,214
[45] Date of Patent: Jun. 28, 1994

[54] FACSIMILE APPARATUS

[75] Inventors: Kazuya Ijuin, Tokyo; Michio Kasuya, Yokohama; Shinnichiro Otsuki, Kawasaki, all of Japan

[73] Assignee: Canon Kabushiki Kaisha, Tokyo, Japan

[21] Appl. No.: 887,812

[22] Filed: May 26, 1992

[30] Foreign Application Priority Data

May 29, 1991 [JP] Japan .................. 3-152289

[51] Int. Cl.⁵ .............. H04N 1/00; H04N 1/04
[52] U.S. Cl. ................... 358/476; 358/406; 358/429; 358/296
[58] Field of Search .......... 358/285, 286, 293, 298, 358/498, 304, 483, 256, 401, 471, 296, 447, 294, 497, 304, 449, 474, 406, 429; 355/311, 321, 200, 230; 346/1.1, 107 R, 160, 136, 76 PH; 271/10, 110, 118, 122, 256, 9

[56] References Cited

U.S. PATENT DOCUMENTS

| | | | |
|---|---|---|---|
| 4,614,949 | 9/1986 | Hakkaku et al. | 346/76 PH |
| 4,630,123 | 12/1986 | Kadomatsu | 358/256 |
| 4,754,337 | 6/1988 | Nohtomi et al. | 358/286 |
| 4,768,100 | 8/1988 | Kunishima et al. | 358/285 |
| 4,849,824 | 7/1989 | Sakuragi et al. | 358/296 |
| 4,895,288 | 1/1990 | Kotani et al. | 226/109 |
| 4,910,602 | 3/1990 | Sakuragi | 358/296 |
| 5,017,945 | 5/1991 | Sasai et al. | 346/136 |
| 5,057,930 | 10/1991 | Curley | 358/296 |
| 5,060,076 | 10/1991 | Curley | 358/296 |
| 5,089,897 | 2/1992 | Curley | 358/296 |
| 5,140,438 | 8/1992 | Kurahashi et al. | 358/401 |

FOREIGN PATENT DOCUMENTS

| | | |
|---|---|---|
| 299437 | 1/1989 | European Pat. Off. |
| 364827 | 4/1990 | European Pat. Off. |
| 416596 | 3/1991 | European Pat. Off. |
| 4004418 | 8/1990 | Fed. Rep. of Germany |

*Primary Examiner*—Paul Ip
*Attorney, Agent, or Firm*—Fitzpatrick, Cella, Harper & Scinto

[57] ABSTRACT

An original feeding apparatus is structured with a first housing and second housing to enable the second housing to be opened and closed, and is provided with a feeding member for carrying an original respectively in the first housing and second housing. The original feeding apparatus according to the present invention is characterized by providing the aforesaid first housing with an original inlet for inserting an original and an original outlet for exhausting the original and at the same time, arranging the first housing to serve dually as an upper guiding plane when an original is fed while the second housing to serve dually as a lower guiding plane at the time of the original being fed.

3 Claims, 12 Drawing Sheets

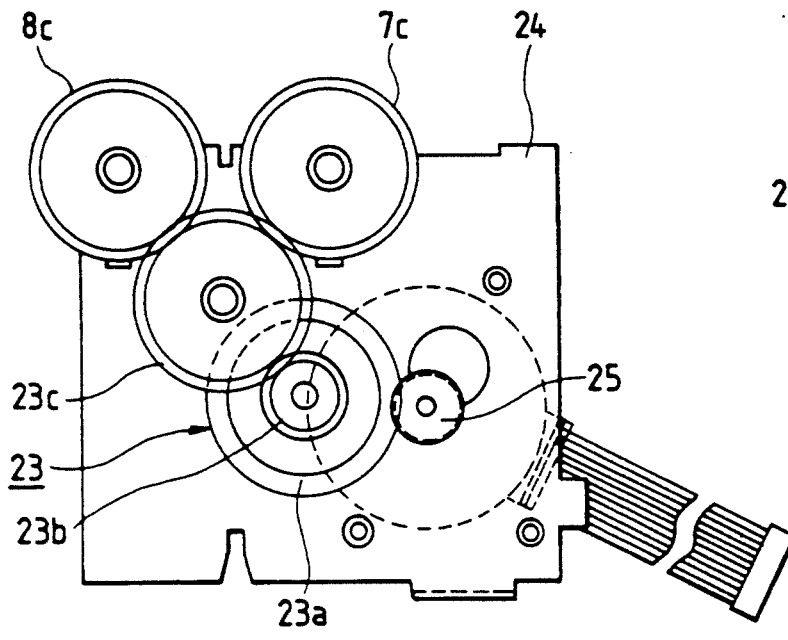
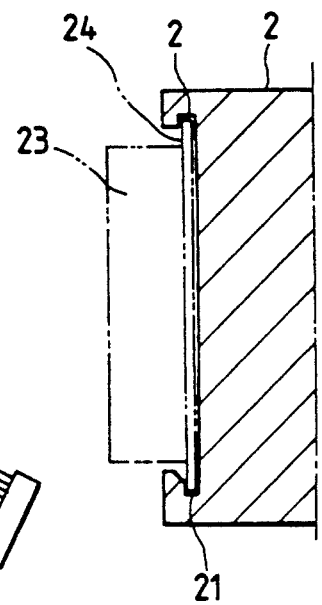
FIG. 9A  FIG. 9B
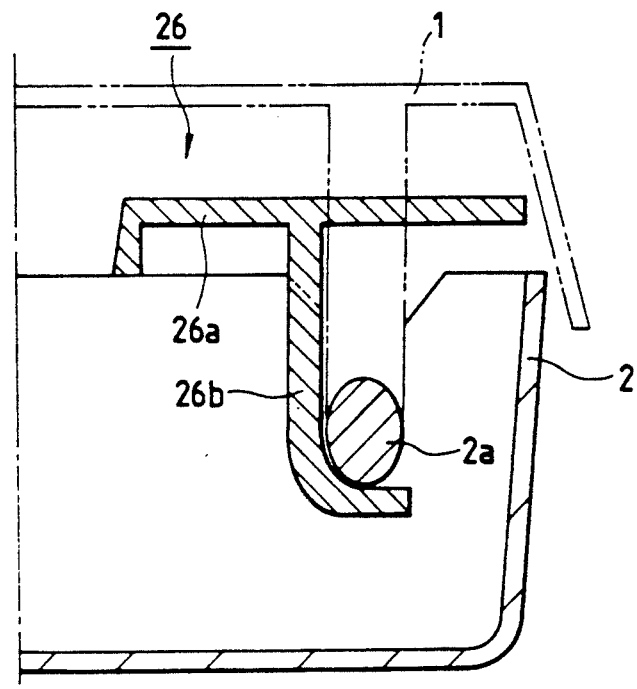
FIG. 10

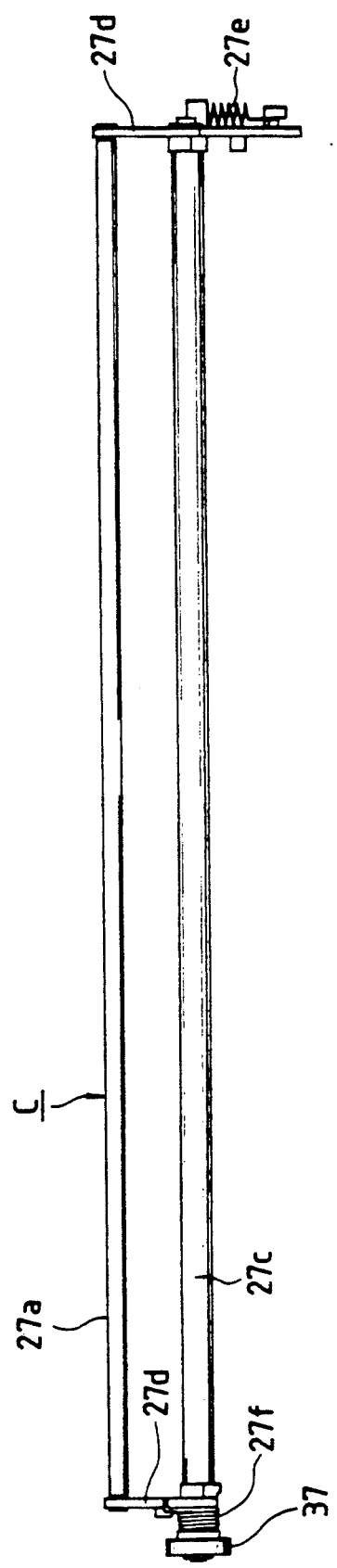

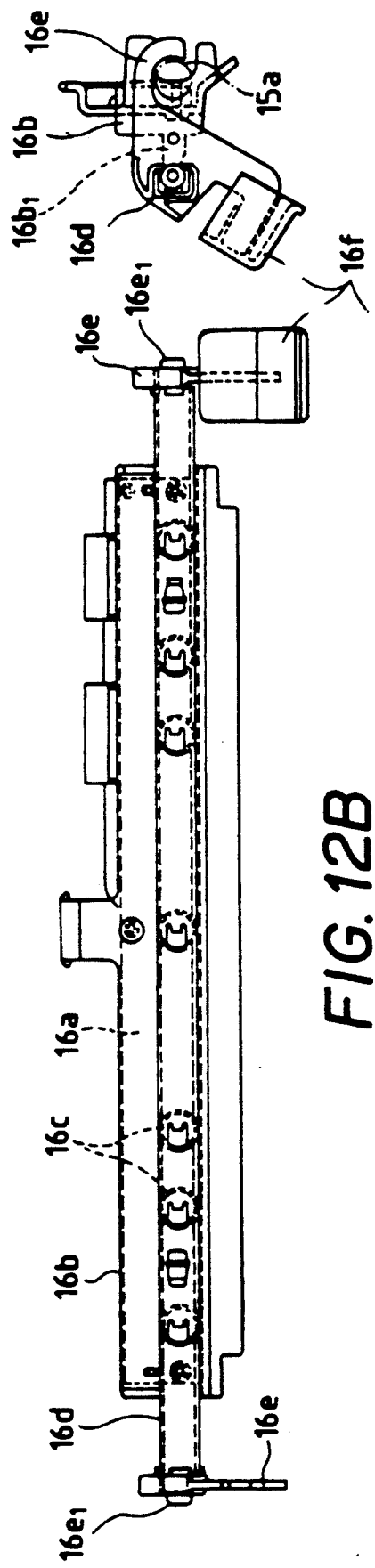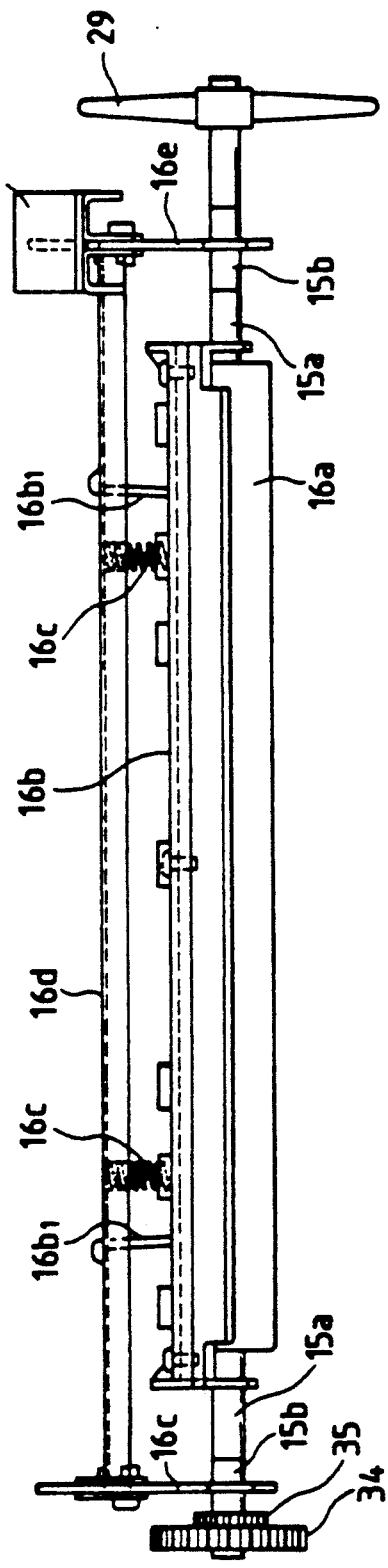
FIG.12A
FIG.12B

FACSIMILE APPARATUS

BACKGROUND OF THE INVENTION

1. Field of the Invention

The present invention relates to a facsimile apparatus with a first housing and a second housing which constitute the exterior of the apparatus and serve dually as an original feeding guide.

2. Related Background Art

Traditionally, a facsimile apparatus is structured with a main body frame which serves to be a nucleus to fabricate the apparatus wholly by combining three parts, an upper cover, a lower cover, and the main frame as disclosed in U.S. Pat. No. 4,768,100.

Also, recently, there has been disclosed an apparatus structured with two parts, an integrated body of the main frame and the lower cover, and the upper cover which is incorporated therewith, to fabricate the apparatus wholly such as described in U.S. patent application Ser. No. 07/710,836 filed on Jun. 5, 1991.

In a facsimile apparatus, a cover serving as its upper cover, on which an operation panel constituting the external body of the apparatus, is installed on the cover for the main body of the apparatus, a lower cover, in which an original reading system and recording system are incorporated. In the above-mentioned cover and the cover for the main body of the apparatus, the original reading system, recording system, and others are installed per unit, and the structure is arranged so that the fabrication of an apparatus is completed through a multistage assembling process.

In the above-mentioned apparatus, an original which is inserted into an original inlet provided between the operation panel and the cover is carried to be reading unit while being guided by a guide member separately provided between them. Then, subsequent to the image of the original having been read, the original is exhausted again from the original outlet provided between the operation panel and the cover to an exhausted sheet tray arranged outside the apparatus.

However, according to the prior art described above, a guide member for guiding the conveyance of the original is separately provided between the operation panel and the cover. Consequently, the number of parts is increased with the resultant increase in the number of the assembling processes. In addition, the assembly is required per unit, leading to a higher cost and a larger size of the apparatus as well.

SUMMARY OF THE INVENTION

With a view to eliminating the above-mentioned drawbacks, it is an object of the present invention to provide a facsimile apparatus which can be assembled more efficiently by constructing the entire body of the apparatus with two parts, a first housing and a second housing, and at the same time, forming original guiding planes on these first and second housings in order to reduce the number of parts.

The above-mentioned and other objects, features and advantages of the present invention will become more apparent by reference to the detailed description of the specific embodiments set forth below.

BRIEF DESCRIPTION OF THE DRAWINGS

FIGS. 9A and 9B are views illustrating a mounting structure of a read driving unit with respect to the cover of the main body of the apparatus.

FIG. 10 is a view illustrating a mounting structure of a power source cover with respect to the cover of the main body of the apparatus.

FIG. 11 is a view illustrating a wind straightening member.

FIGS. 12A and 12B are views illustrating recording means and its holding mechanism.

DETAILED DESCRIPTION OF THE PREFERRED EMBODIMENTS

Hereinafter, in reference to the accompanying drawings, an embodiment of the presnet invention will be described.

Figure 1:
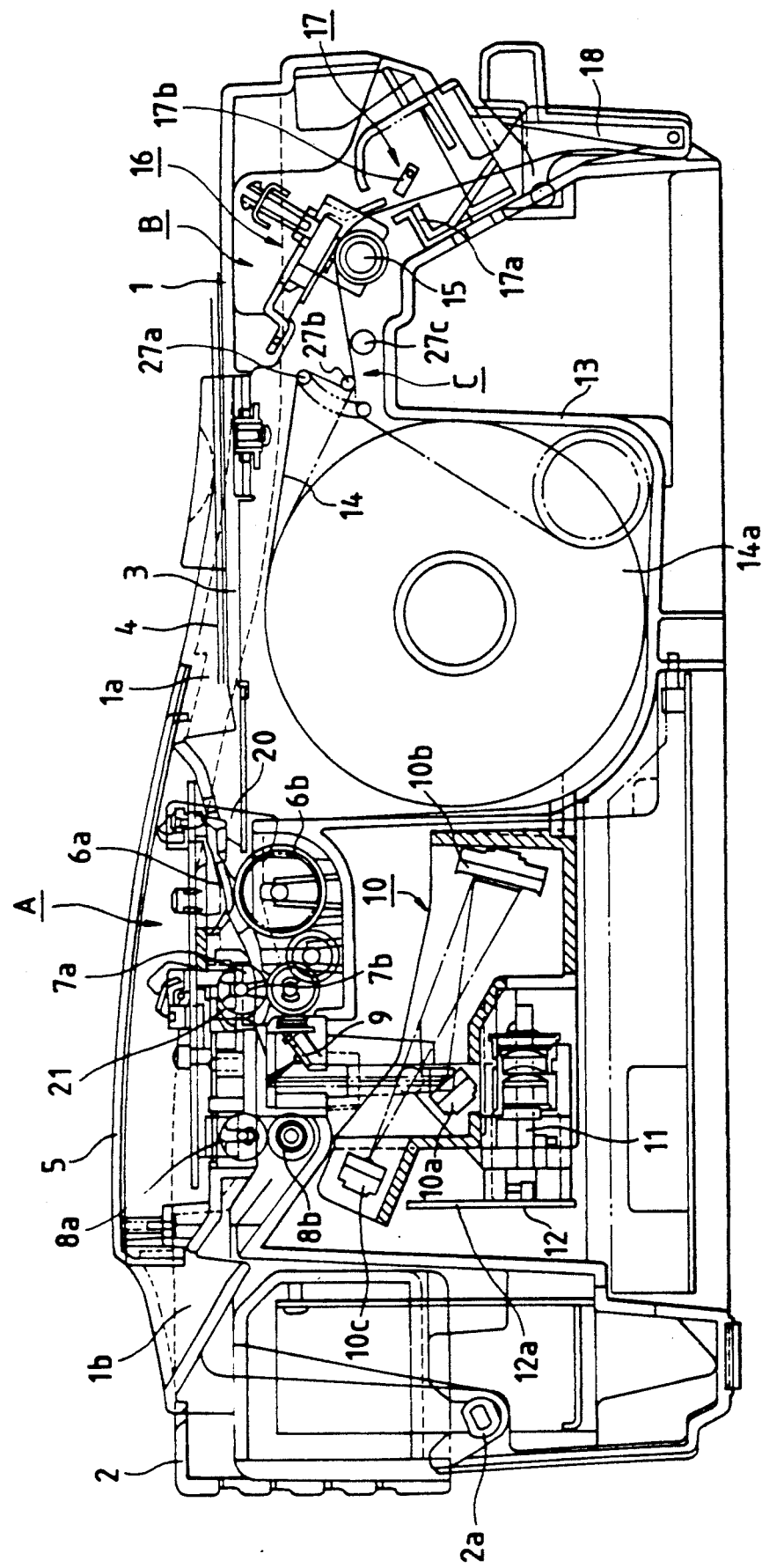
FIG. 1 is a cross-sectional view schematically illustrating the structure of a facsimile apparatus.

FIG. 1 is a cross-sectional view schematically showing the structure of a facsimile apparatus as a whole.

For this facsimile apparatus, a cover 1 which is a first housing is mounted on a cover 2 of the main body of the apparatus which is a second housing so that it can be freely opened and closed with a hinge 2a as its pivot as shown in FIG. 1. Here, the structure is arranged to enable the above-mentioned cover 1 to be hooked to the cover 2 of the main body of the apparatus by means of click mechanism which is not shown in FIG. 1. In the housing comprising the cover 1 mentioned above and the cover 2 of the main body of the apparatus, there are incorporated a reading unit A and a recording unit B which has a curl straightening mechanism C (hereinafter referred to as decurl mechanism C)

Entire Structure

At first, in reference to FIG. 1, the entire structure of the apparatus will be described briefly. The read unit A is actuated to its reading operation when a plurality of original sheets 4 are set on an original stacker 3 formed on the aforesaid cover 1 and an operation unit 5 provided for the cover 1 is operated accordingly. The structure is arranged to separate the several sheets of the original 4 of those plural sheets of the original 4 set on the aforesaid original stacker 3 one by one from the bottom for feeding by a separation compression piece 6a and a separation feeding roller 6b. The original 4 thus separated is irradiated by light from a light source 9 while it is being carried by a pair of feed rollers 7a and 7b and a pair of exhaust roller 8a and 8b, and the reflected light rays are irradiated in an optical unit 10 to be converted into electrical signals when arrived at a photoelectric conversion element 12 such as a CCD through a first reflection mirror 10a, a second reflection mirror 10b, a third reflection mirror 10c, and a condenser lens 11. In a case of copy mode, these signals are transferred to the recording unit B of its own, and in a case of facsimile mode, they are transferred to a recording unit of the other apparatus.

In the recording unit B, there is provided a roll holder 13 of a drop-in type at a predetermined position on the cover 2 of the main body of the apparatus, and in this roll holder 13, a sheet roll 14a, around which a rolled thermo-sensitive recording sheet 14 is wound, is mounted. The recording sheet 14 withdrawn from the above-mentioned sheet roll 14a is fed by the rotation of a platen roller 15 which constitutes the feeding member. At this juncture, the recording sheet 14 which is a recording medium is being bent in the direction opposite to its curling for correction of the curl while being passed through a decurl mechanism C.

On the above-mentioned recording sheet 14 thus decurled, a specific image is formed by recording means 16 and the recording sheet 14 is cut into a page unit by a cutter 17 subsequent to the recording, and the structure is arranged to exhaust each page into an exhausted sheet stacker 18.

Now, the structure of each part of the read unit A of the aforesaid facsimile apparatus will be described in detail.

Original Feeding Unit

As described earlier, the originals 4 set on the original stacker 3 are fed one by one by the function of the separation compression piece 6a and a separation feeding roller 6b which constitute the feeding member, and further fed by the pair of the feeding rollers 7a and 7b and the pair of the exhausting rollers 8a and 8b. The above-mentioned separation compression piece 6a, the upper feeding roller 7a, and the upper exhausting roller 8a are mounted on the cover 1 side while the separation feeding roller 6b, the lower feeding roller 7b, and the lower exhausting roller 8b are mounted on the cover 2 of the main body side. Each of the above-mentioned feeding members is intended to feed the original 4 by pressure exerted between each of the feeding rollers arranged vertically. Therefore, it is necessary to pressurize the separation compression roller 6a, upper feeding roller 7a, and upper exhausting roller 8a against the separation feeding roller 6b, lower feeding roller 7b, and lower exhausting roller 8b, respectively.

Figure 2:
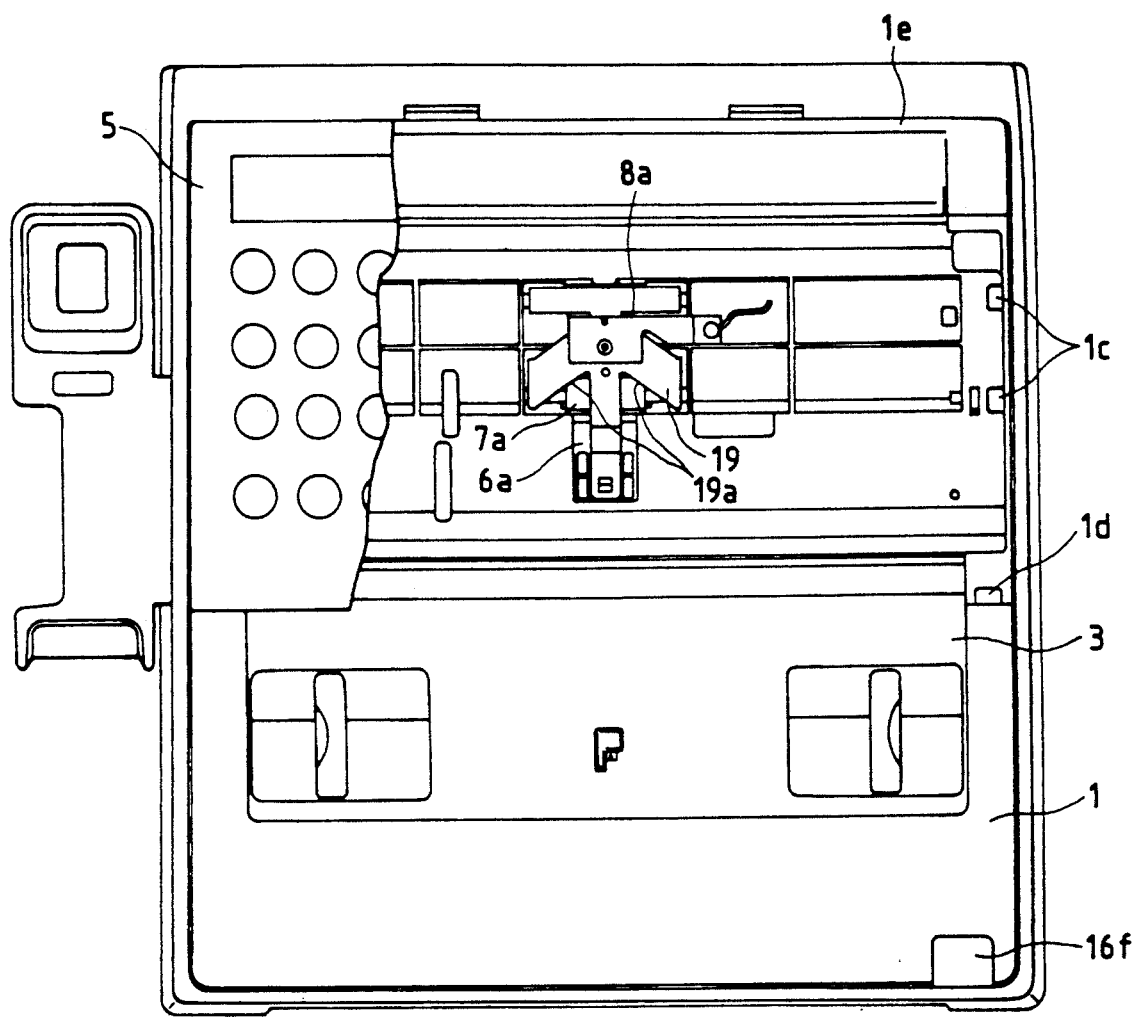
FIG. 2 is a view illustrating a feed pressurizing member in an original feeding apparatus.

Thus, the structure is arranged to give pressure to the reverse side of the above-mentioned separation compression piece 6a and the upper feeding roller 7a, and the rotational shaft of the upper exhausting roller 8a, respectively, by screwing one flat spring 19 which constitutes a feed compression member at a predetermined position on the cover 1 as shown in FIG. 2. The leading end of the above-mentioned flat spring 19 is bent in the direction perpendicular or at given angles to the horizontal direction, so that the separation compression piece 6a and each of the rotational shafts are compressed efficiently. Also, in order to pressure each of the members evenly without being affected by the pressure of any adjacent members, V-letter shaped cut-outs 19a are provided.

With the structure described above, it is possible to reduce the number of parts as well as to improve the assembling capability for the implementation of a lower cost as compared with a conventional example where a pressure member is provided on the cover 1 side with respect to the separation compression piece 6a, upper feeding roller 7a, and upper exhausting roller 8a.

Figure 3:
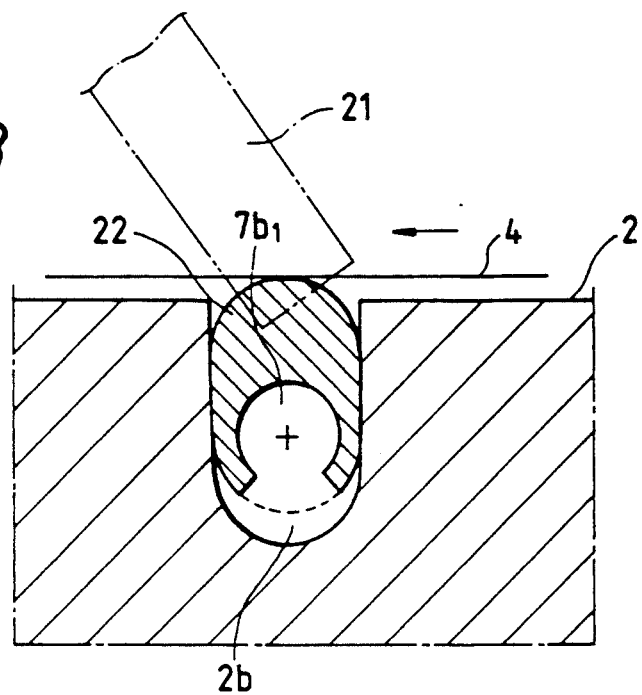
FIG. 3 is a view illustrating an original feeding guide member.

Also, in FIG. 1, on the side of the cover 1, an original detection sensor 20 is provided to detect the presence of an original 4 on the upper stream side in the original feeding direction from the separation compression piece 6a and separation feeding roller 6b, and an original end sensor 21 is provided on the down stream side in the original feeding direction from the feeding roller pair 7a and 7b to detect the passing of the leading end and trailing end of the original 4. Also, on the surface of the cover 2 of the main body of the apparatus, a groove 2b of U-letter shape at its cross-section is provided to fit in the above-mentiond lower feeding roller 7b by means of drop-in as shown in FIG. 3. Then, the predetermined portion of the rotational shaft $7b_1$ of the above-mentioned lower feeding roller 7b is thinned, and to this thinned portion, a mold ring 22 which constitutes an original feeding guide member is fitted in to maintain a predetermined height of the original feeding plane. This mold ring 22 is fitted in the above-mentioned groove 2b to hold rotatively the rotational shaft $7b_1$ of the lower feeding roller 7b.

When the presence of an original 4 is detected by the original detection sensor 20, the one-by-one separation feeding is performed to feed each of the originals to the down stream side by the separation compression piece 6a and separation feeding roller 6b. The separation feeding roller 6b is structured to rotate intermittently because if an original 4 is not supplied for a predetermined period, the original end detection sensor 21 cannot detect the end portions of the original 4. Then, the aforesaid mold ring 22 is fitted on the rotational shaft $7b_1$ of the lower feeding roller 7b to maintain the original feeding plane at a predetermined height in the aforesaid groove 2b. Consequently, the feeding of the original 4 can be detected accurately to stabilize the feeding operation. Hence eliminating the possibility which exists in the conventional apparatus that when an original 4 passes the feeding roller pair 7a and 7b, the leading end of the original tends to drop in the groove 2b formed on the cover 2 of the main body of the apparatus to generate a jam or disable the original end detection sensor 21 on the down stream side to detect the end portion of the original 4, leading to an unsteady feeding operation.

Also, on the aforesaid cover 1, an inlet 1a for inserting the original 4 and an outlet 1b for exhausting the original 4 after image reading are respectively formed as shown in FIG. 1. Here, the reverse side of the cover 1 serves dually as an upper guiding plane when the original is fed. Also, the upper plane of the cover 2 of the main body of the apparatus serves dually as a lower guiding plane when the original is fed.

According to the above-mentioned structure, there is no need for providing any guide members separately for guiding the original 4. Thus making it possible to reduce the number of parts. Also, there is no need for assembling the part unit-by-unit so that its assembling capability will be enhanced. Also, providing a feeding pass for the original between the cover 1 and the cover 2 of the main body of the apparatus enables the operation unit 5 to modified for use in accordance with the needs of an operator without replacing the aforesaid cover 1. Further, the aforesaid cover 1 guides the original 4 substantially in parallel with the cover 2 of the main body of the apparatus thereby to enable distortion of the original 4 to be straightened.

Figure 4:
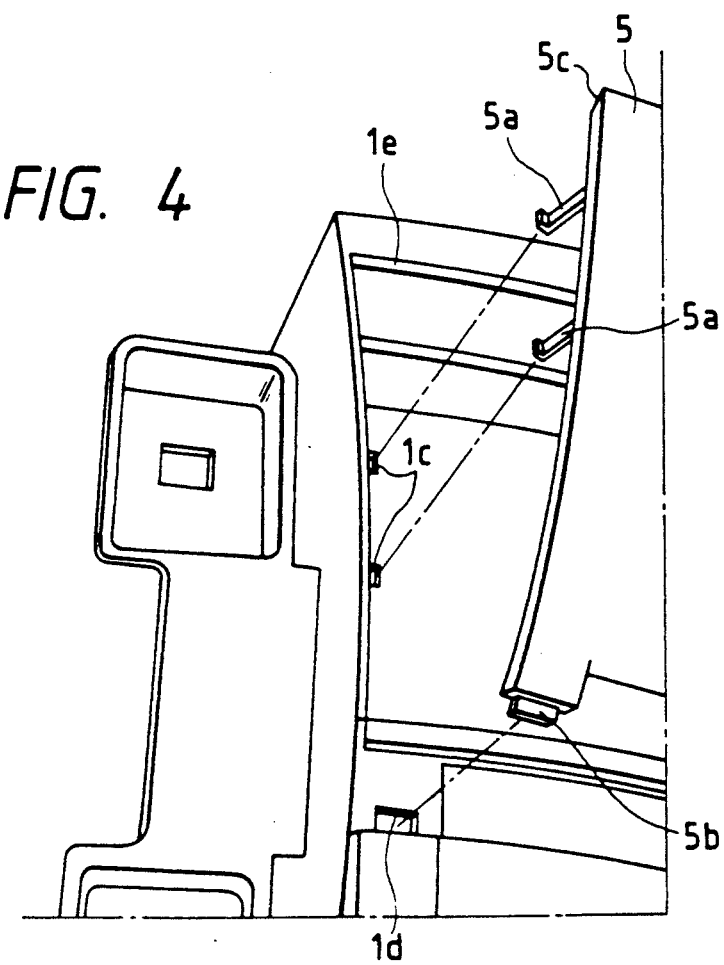
FIG. 4 is a view illustrating a mounting unit for the cover of an operation unit.

Also, in the operation unit 5 mounted on the aforesaid cover 1, a catch 5a with a wedge type leading end, a catch 5b provided at the side end portion of the inlet 1a for inserting the original 4, and a slope 5c matching with the cover 1 are formed at the predetermined positions on both ends of the reverse side of the operation panel as shown in FIG. 4. Also, at the predetermined positions on the cover 1, there are provided respectively a catching hole 1c in which the above-mentioned catching piece 5a is inserted, a catching hole 1d in which the catch 5b is inserted, and the slope 1e which matches with the slope 5c.

When the above-mentioned operation unit 5 is mounted on the cover 1, the catching piece 5b mentioned above is inserted in the catch hole 1d and at the same time, the catching piece 5a is inserted into the catch hole 1c to match the slope 5c with the slope 1c for the required installation.

It is therefore possible to mount the operation unit 5 on the cover 1 without using any machine screws, leading to an easier assembly and the reduction of the number of parts for the implementation of a lower cost manufacturing. Also, it is possible to enhance its versatility when the operation unit 5 should be used as an OEM.

Optical Unit

Figure 5:
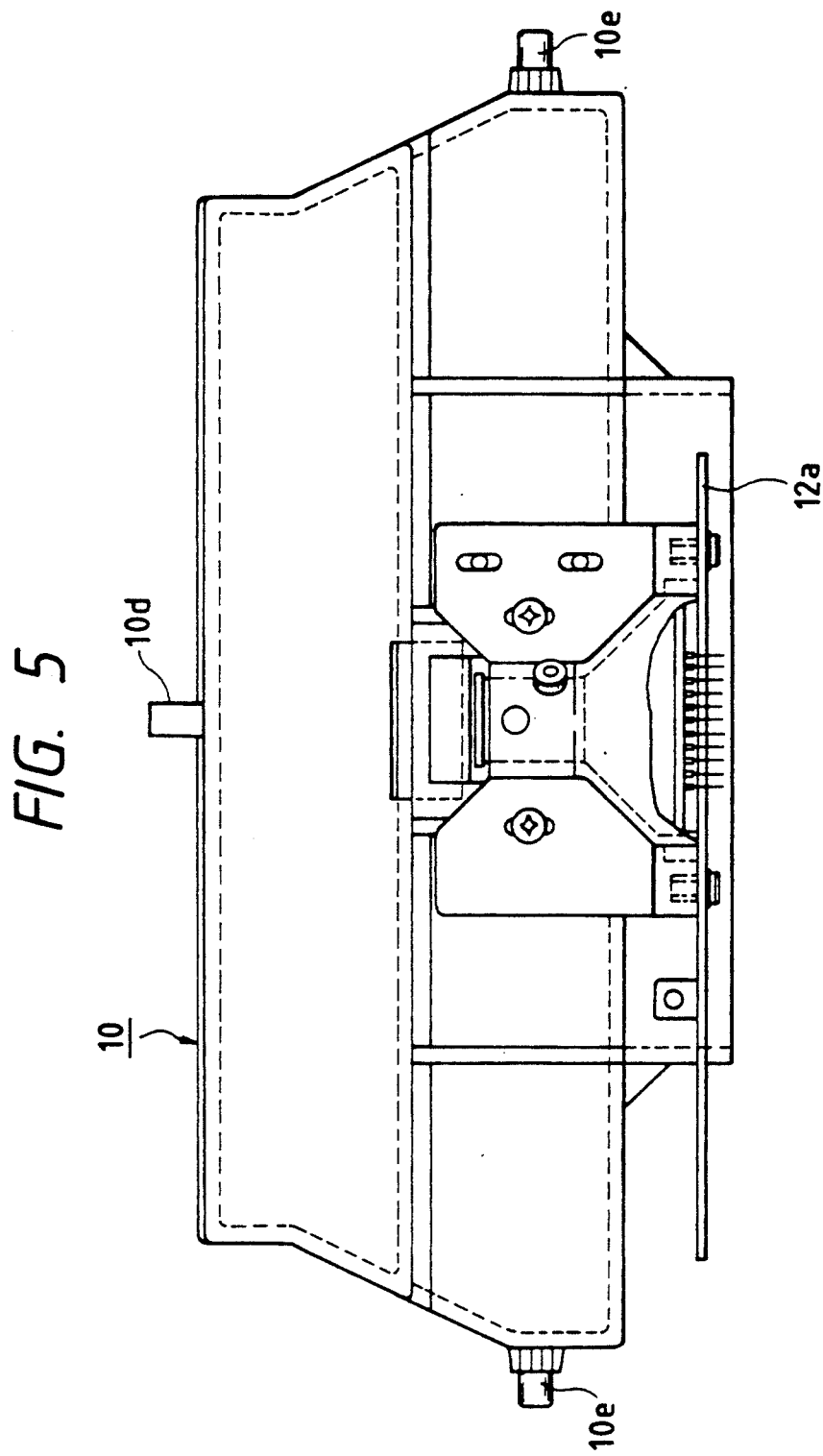
FIG. 5 is a view illustrating a state of an optical unit being mounted on a CCD substrate.

The original 4 fed by the aforesaid original feeding unit is irradiated by light from the light source 9 using an LED array while being fed between the feeding roller pair 7a and 7b and exhausting roller pair 8a and 8b, and the reflected light rays are irradiated in the optical unit 10. The optical unit 10 is structured as shown in FIG. 5 by incorporating reflection mirrors 10a, 10b and 10c and a condenser lens 11 integrally in a housing. In this optical unit 10, a CCD substrate 12a provided with photoelectric conversion elements 12 is integrally mounted by screws.

Figure 6:
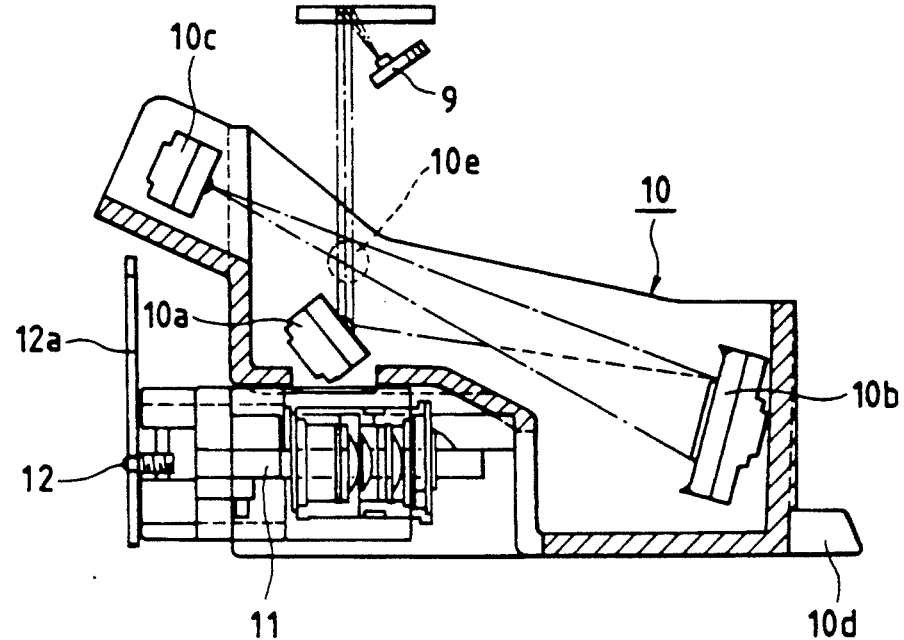
FIG. 6 is a cross-sectional view illustrating the optical unit.

The reflected light rays irradiated from the surface of the original in the above-mentioned optical unit 10 are guided as shown in FIG. 6 to a first reflection mirror 10a, a second reflection mirror 10b, and a third reflection mirror 10c, and again to the second reflection mirror 10b sequentially, and the structure is arranged to enable them to reach the photoelectric conversion element 12 such as CCD through the condenser lens 11 to be converted into electrical signals.

Figure 7:
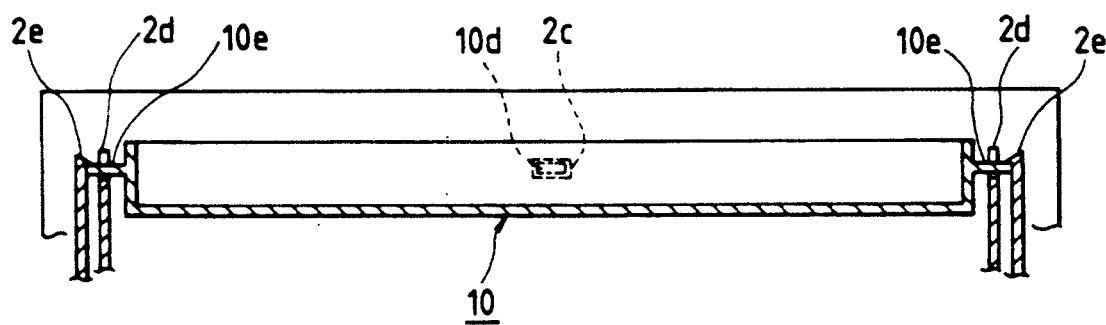
FIG. 7 is a view illustrating a holding mechanism for the optical unit.

Also, on the exterior face of the above-mentioned optical unit 10, a projected piece 10d is projectingly provided on the leading end (upper side of FIG. 5) in the mounting direction and a projected piece 10e is projectingly provided on the both side (left and right hand sides of FIG. 5) of the longitudinal direction, respectively. On the other hand, at a predetermined position on the cover 2 of the main body of the apparatus, a fitting hole 2c is made for inserting the projected piece 10d of the optical unit 10 mentioned above for fixation, as shown in FIG. 7, and on the left and right hand sides thereof, the supporting holes 2d are respectively provided for supporting the projected pieces 10e. As a result, the optical unit 10 is mounted on the cover 2 of the main body of the apparatus and supported at three points, the fitting hole 2c and the left and right hand side supporting holes 2d.

When the above-mentioned optical unit 10 is mounted on the cover 2 of the main body of the apparatus, the projected piece 10d is inserted into the fitting hole 2c at first, and the projected pieces 10e on both sides on the left and right hands are dropped in respectively into the supporting holes 2d for fitting.

As a result, the optical unit, 10 can be mounted by dropping each of the projected pieces into each of the holes on the cover 2 of the main body of the apparatus for fitting thereby to make its assembly easier without any staged machine screws which are conventionally used to mount the unit on the cover 2 of the main body of the apparatus. Hence reducing the number of parts and enhancing the assembling capability for the implementation of a lower cost manufacturing.

Furthermore, in the vicinity of the outer periphery of the above-mentioned supporting holes 2d, hooking members 2e made of synthetic resin are projectingly provided. These hooking members 2e are structured to be closely in contact for supporting with the end portions and upper planes of the projected pieces 10e which are projected from the supporting holes 2d to the right and left hand sides.

Therefore, if a shock such as a dropping vibration or the like is given to the apparatus, the resilient deformation of the above-mentioned hooking members 2e can absorb such a shock to improve the shock absorption capability of a protection mechanism for the optical unit 10 and enhance the safety as well.

Figure 8:
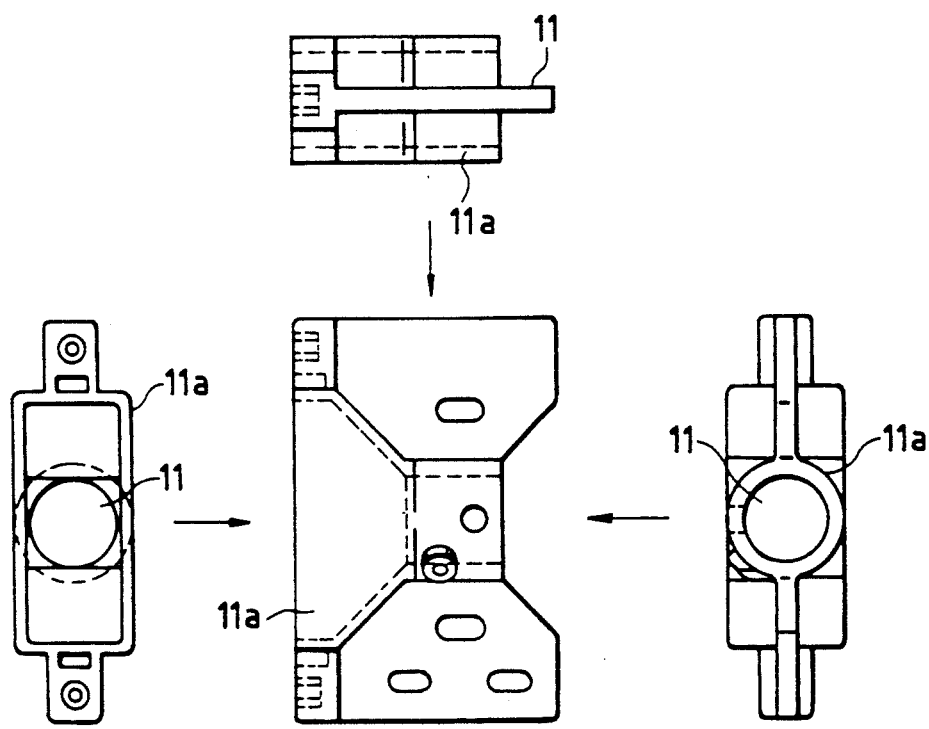
FIG. 8 is a view illustrating a lens holder.

Also, the condenser lens 11 incorporated in the above-mentioned optical unit 10 is supported as shown in FIG. 8 by a cylindrical lens holder 11a symmetrically in every direction, vertically and horizontally, and this lens holder 11a is tightly mounted on the aforesaid CCD substrate 12a by screws. Consequently, the condenser lens 11 is supported on a straight line on the optical path with respect to the photoelectric conversion elements 12. In this respect, polycarbonate is used for the above-mentioned lens holder 11a in the present embodiment.

According to the structure set forth above, the condenser lens 11 is supported by the cylindrical lens holder 11a symmetrically in every direction vertically and horizontally, making it possible to minimize deformation due to thermal expansion and others resulting from thermal change for the maintenance of reading accuracy. In this respect, if the cylindrical lens holder 11a is at least vertically symmetrical, the deformation due to thermal change can be restrained.

Also, the aforesaid lens holder 11a is tightly mounted on the CCD substrate 12a for supporting the condenser lens 11 thereby to prevent the ingression of dust and other particles into the photoelectric conversion element 12.

Also, FIG. 9A is the read driving unit in which a gear train 23 is mounted on a driving board 24 for transmitting the driving force from the driving power source to the feeding roller pair 7a and 7b and exhausting roller pair 8a and 8b of the aforesaid read unit A. A motor gear 25a coupled to the driving shaft of the read motor 25 is structured to engage respectively with a feeding gear 7c and exhausting gear 8c mounted on the respective ends of the lower feeding roller 7b and lower exhausting roller 8b which are not shown in FIG. 9B to transmit the driving force through the transmission gears 23a, 23b and 23c rotatively mounted on the aforesaid driving board 24. The driving board 24 with the above-mentioned gear train mounted thereon is installed on the cover 2 of the main body of the apparatus as shown in FIG. 9C by incorporating the respective parts of its upper and lower ends into the concave grooves 2f provided at predetermined upper and lower positions of the cover 2 of the main body of the apparatus.

Also, as shown in FIG. 1, a power source cover 26 is provided to protect the primary side of the power source, and this power source cover 26 is as shown in FIG. 10 installed by hooking the bending portion of the trailing piece 26b with its L-letter cross-section, which is arranged in the vertically downward with respect to the cover face 26a, to the hinge 2a which is the center of rotation of the aforesaid cover 1 and cover 2 of the main body of the apparatus. An arm is provided on the opposite side of the aforesaid cover 1 to allow it to be opened only at a predetermined angles to the cover 2 of the main body of the apparatus. Thus preventing the cover 1 from being released so as not to cause the power source cover 26 to be off positioned from the hinge 2a.

According to the structure set forth above, the driving board 24 and the power source cover 26 can both be mounted on the cover 2 of the main body of the apparatus without any machine screws. It is therefore possible to make its assembly easier as well as to reduce the number of parts for the implementation of a lower cost manufacturing.

Subsequently, in conjunction with the accompanying drawings, the structure of each portion of the recording unit B of the aforesaid facsimile apparatus will be described in detail.

The recording sheet 14 drawn from the sheet roll 14a stored in the roll holder 13 as described earlier is fed by the rotation of the platen roller 15 which constitutes a feeding member, and the recording sheet 14 is bent in the direction opposite to its curling direction to correct its curl when passing through a known decurl mechanism C.

On the above-mentioned decurled recording sheet 14, a given image is formed by recording means 16, and the structure is arranged to cut the recording sheet 14 by a cutter 17 into a page unit subsequent to the recording and to exhaust it onto an exhausted sheet stacker 18.

Open-Close Member

The aforesaid cover 1 and cover 2 of the main body of the apparatus constitute not only the read unit A but also the exterior of the recording unit B. The structure is arranged so that when the cover 1 is disconnected from the cover 2 of the main body of the apparatus, the recording unit A is also disconnected.

Decurl Mechanism

The recording sheet 14 drawn from the sheet roll 14a as described earlier is bent in the direction opposite to its curling direction when guided to pass through a decurling shaft 27a and guiding shaft 27b which constitute a curl correction member. Thus the curling thereof is being corrected. The above-mentioned decurling shaft 27a is supported at its both ends as shown in FIG. 11 by arms 27d which are rotative around a rotational shaft 27c. The above-mentioned arm 27d is biased by a tensioning spring 27e in counter-clockwise direction shown in FIG. 1. Also, the above-mentioned rotational shaft 27c is structured to be rotated by the driving force from the driving power source which is transmitted or released by means of a spring clutch 27f.

Recording Means

Hereunder, the description will be made of the structure of recording means 16 for recording a given image on the aforesaid recording sheet 14. In the present embodiment, the so-called line type thermal head is used for the recording head 16a, in which a number of heating elements are arranged to be calorific when charged in the width direction of the recording sheet 14 on the plane contacting with the recording sheet 14, and the recording is performed by energizing the aforesaid heating elements in accordance with image information for selectively heating the recording sheet 14 to allow it to develop color.

Figure 13:
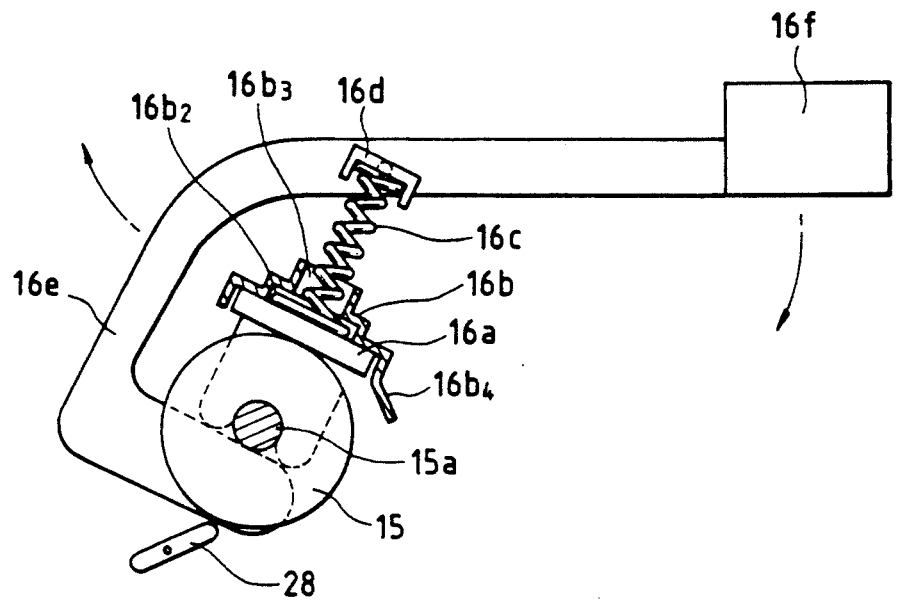
FIG. 13 is a view illustrating a recording head holding mechanism.

Also, the above-mentioned recording head 16a is supported by a recording head holder 16b as shown in FIGS. 12A, 12B, and FIG. 13, and on this recording head holder 16b, one end of a coil spring 16c, which is a resilient member to press the recording head 16a on a platen roller 15, is fixed. The other end of the coil spring 16c is supported by a supporting member 16d having the cross-section of an elongated □ shape. Also, the above-mentioned recording head holder 16b and supporting member 16d are coupled to each other by hooking a hooking member $16b_1$ provided for the holder 16b to the supporting member 16d. Also, a part $16b_4$ of the above-mentioned recording head holder 16b is projectingly formed as shown in FIG. 13, and this serves to function as a guide for the recording sheet 14 to be fed toward the cutter 17.

Also, at both ends of the above-mentioned supporting member 16d, there is integrally mounted each of the locking nails 16e, which constitutes a lock member capable of being hooked to the rotational shaft 15a of the platen roller 15 mounted on the cover 2 side of the main body of the apparatus. At the position where the locking nail 16e of the above-mentioned rotational shaft 15a is hooked, a resin roller 15b is rotatively fitted. The structure is arranged so that by hooking the above-mentioned locking nail 16e to the roller 15b, the recording head 16a can be pressed by the above-mentioned coil spring 16c to the platen roller 15. Also, at one end of the locking nail 16e mentioned above, a lock releasing button 16f is provided to be projected at a part of the cover 1 for releasing the hooking state between the above-mentioned locking nail 16e and rotational shaft 15a. The structure is further arranged so that when the lock releasing button 16f is depressed to release the locking state between the locking nail 16e and roller 15b, the lock releasing button 16f is returned by the resiliency of the coil spring 16c to the state before it is depressed.

Further, the structure is arranged to align the abutting portion of the coil spring 16c against the supporting member 16d mentioned above, the pressing portion of the coil spring 16c which presses the recording head 16a, pressing portions of the recording head 16a and platen roller 15, and the hooking portions of the locking nail 16e and roller 15b substantially on a straight line.

According to the structure set forth above, the reaction force which is given to one end of the coil spring 16c is received by the supporting member 16d making it unnecessary to provide a metal plate for the inner cieling of the cover as in the case of the conventional apparatus. Hence preventing any resonance of noises created by the metal plate at the time of recording.

Also, the biasing direction of the coil spring 16c is linearly condensed to avoid creating any deformation of the other members. Thus making an easy and accurate setting of pressure by the coil spring 16c.

Further, the recording sheet 14 is guided by a part of the recording head holder 16b, or the lock releasing button 16f is returned by the coil spring 16c which presses the recording head 16a, so that the number of parts can be reduced to implement a lower cost manufacturing.

Also, the mounting portion of the coil spring 16c of the aforesaid recording head holder 16b is conductively connected to the concavity 16b$_2$ for preventing its off position as shown in FIG. 13 and at the same time, it is structured by a small guide barrel 16b$_3$ having an inner diameter smaller than the aforesaid concavity 16b$_2$. Then, one end of the coil spring 16c is formed smaller than the inner diameter of the aforesaid concavity 16b$_2$ and larger than the inner diameter of the aforesaid guide barrel 16b$_3$ simultaneously.

According to the above-mentioned structure, it is possible to mount the coil spring 16c on the recording head holder 16b just by inserting it through the aforesaid concavity 16b$_2$. Therefore, as compared with the conventional art where the connection is made by hooking the coil spring to the cut up portion of the metal plate on the holder side or cover 1 side, its mounting becomes extremely easy.

Also, the above-mentioned coil spring 16c is orientated by the guide barrel 16b$_3$, and the biasing direction of the recording head 16a by the coil spring 16c can be set with ease.

Also, the aforesaid recording head 16a, recording head holder 16b, coil spring 16c, supporting member 16d, locking nail 16e, and lock releasing button 16f are mounted by fitting each of the projections 16e$_1$ which is projectingly provided on the both sides of the locking nail 16e fixed to both ends of the supporting member 16d in each of the fitting holes (not shown) provided on the reverse side of the cover 1.

Figure 14:
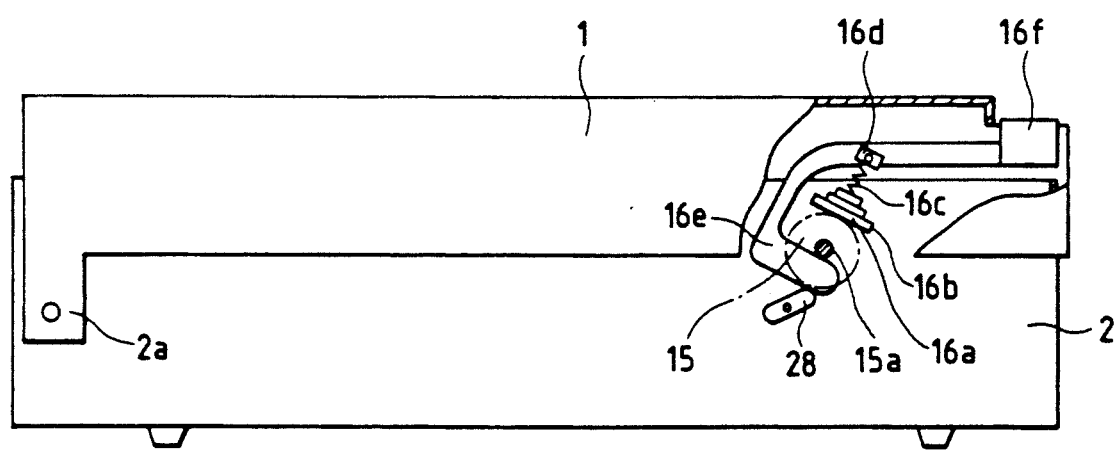
FIG. 14 is a view illustrating a structure for detecting the open-close state of a cover and the cover of the main body of an apparatus.

Also, as shown in FIG. 14, there is provided in the vicinity of the side end portion of the recording driving unit of the rotational shaft 15a of the platen roller 15 on the cover 2 of the main body of the apparatus, an actuator 28 which is detection means for detecting whether the aforesaid locking nail 16e is hooked or its hooking is released. The structure is arranged so that this actuator 28 is rotated to turn on and off a sensor which is not shown in FIG. 14 for the detection of the open-close state of the cover 1.

Therefore, even if there is deformation created for the cover 1 or cover 2 of the main body of the apparatus, it is possible to detect the open-close state of the cover 1 and cover 2 of the main body of the apparatus assuredly by detecting whether the locking nail 16e is hooked or its hooking is released.

Also, hooking the aforesaid locking nail 16e to the rotational shaft 15a of the platen roller eliminates the necessity of any special provision of a locking shaft for hooking the aforesaid locking nail 16e. Hence reducing the number of parts and assembling processes for the implementation of a lower cost manufacturing.

Moreover, providing the roller 15b for the rotational shaft 15a of the aforesaid platen roller 15 enables the hooking of the locking nail 16e and its releasing operation to be performed smoothly.

Now, the platen roller 15 is formed with a roller type member having a high friction coefficient such as hard rubber, which is axially supported on the cover 2 of the main body of the apparatus rotatively, and the structure is arranged to allow it to be driven by a driving source which will be described later. At the end portion of the rotational shaft on the side opposite to the recording driving unit which has the driving source of the above-mentioned platen roller 15, a jam releasing lever 29 is detachably mounted as shown in FIG. 12B.

Cutter

Figure 15:
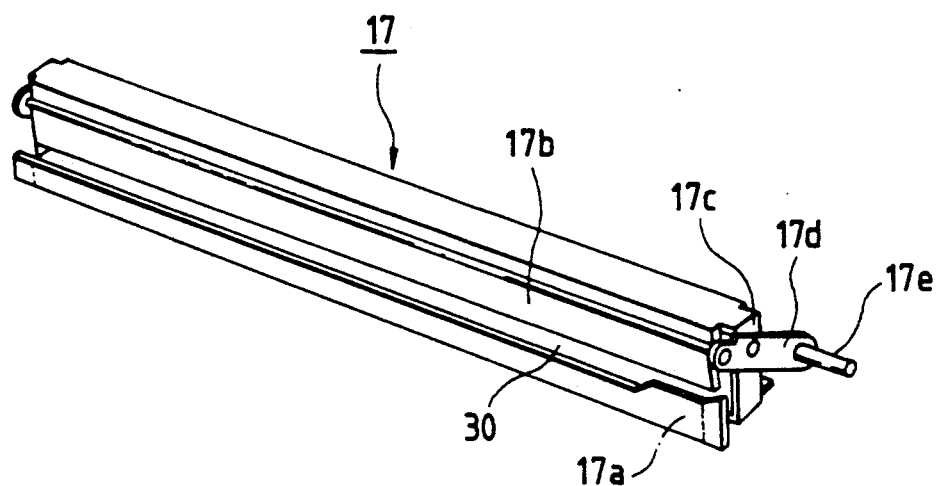
FIG. 15 is a perspective view illustrating a cutter structure.

A cutter 17 is structured with a fixed blade 17a and a rotational blade 17b as shown in FIG. 15, and the fixed blade 17a is fixed to a cutter frame 17c together with a guide member 30 which serves to be a lower guide for the recording sheet 14. Also, the rotational blade 17b is supported at one end of a cutter arm 17d rotatively mounted on both side faces of the cutter frame 17c. At the other end of the cutter arm 17d, a pin 17e is projectingly provided. This pin 17e is coupled to the recording driving unit which will be described later.

The end portion of the above-mentioned rotational blade 17b in the longitudinal direction is projected from the fixed blade 17a by the thickness of the frame 17c. In the present embodiment, however, the above-mentioned guide member 30 is projected from the end portion of the blade of the rotational blade 17b in the longitudinal direction thereby to prevent an operator from touching the rotational blade 17b by mistake.

Recording driving Unit

Subsequently, in reference to FIG. 16 the description will be made of the recording driving unit which includes a driving source for the aforesaid recording aforesaid recording apparatus.

A reference numeral 31 designates a recording motor which is a driving source. This recording motor 31 is driven in normal or reverse rotation to drive each of the platen roller 15, cutter 17, and decurl shaft 27a as described later. The motor gear 32 which is connected to the recording motor 31 engages with an intermediate gear 33a, and an intermediate gear 33b coaxially provided with this intermediate gear 33a engages with an intermediate gear 33c. Also, the intermediate gear 33c engages with a first platen gear 34 rotatively mounted on the end portion of the rotational shaft 15a of the platen roller 15 freely. Also, on the above-mentioned rotational shaft 15a, there is mounted integrally a second platen gear 35 which has a diameter smaller than the first platen gear 34.

Figure 17:
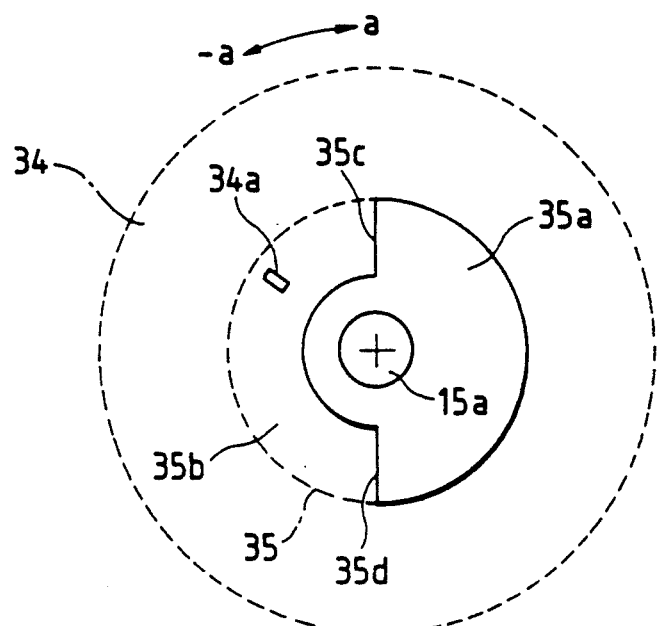
FIG. 17 is a view illustrating a driving force transmission mechanism between a first platen gear and a second platen gear.

The structure of the side face where the first platen gear 34 and second platen gear 35 mentioned above face with each other is such as shown in FIG. 17 that a projection 34a is projectingly provided on the first platen gear 34 side, and on the second platen gear 35 side, a disc type projection 35a is projectingly provided with a cut-off portion 35b arranged in a given length. Then, with the above-mentioned projection 34a and disc type projection 35a constitute driving transmission means.

Therefore, when the aforesaid recording motor 31 is driven in normal rotation (rotational direction indicated by an arrow in FIG. 16), the first platen gear 34 is rotated in the direction indicated by an arrow a. Then, the projection 34a is caused to abut the cut-off end 35c of the disc type projection 35a to rotate integrally with the second platen gear 35. Thus enabling the platen roller 15 to be driven to rotate in the direction indicated by an arrow a. Also, when the aforesaid recording motor 31 is driven to rotate reversely, the first platen gear 34 is rotated in the direction indicated by an arrow —a. Then, the second platen gear 35 is at rest while the projection 34a is being rotated along the cut-off portion 35b. When the disc type projection 35a abuts the cut-off end 35d after a predetermined time differential, the first platen gear is caused to rotate integrally with the second platen gear 35 to enable the platen roller 15 to be rotated in the direction indicated by an arrow —a.

The aforesaid second platen gear 35 engages with the intermediate gear 36, and this intermediate gear 36 engages with the decurl gear 37 which is mounted at one end of the rotational shaft 27c of the arm 27d to support the decurl shaft 27a.

Figure 18:
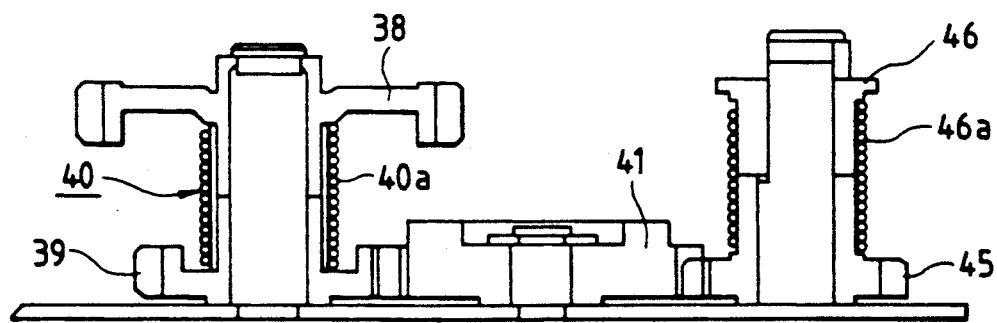
FIG. 18 is a view illustrating a one way clutch for performing the driving control of a cutter gear.

Also, the aforesaid first platen gear 34 engages with the intermediate gear 38. This intermediate gear 38 is coaxially mounted with the intermediate gear 39 having a smaller diameter. The above-mentioned intermediate gears 38 and 39 are coupled through a one-way clutch 40 as shown in FIG. 18. This one-way clutch 40 does not function to transmit driving force to the intermediate gear 39 because a clutch spring 40a is relaxed when the recording motor 31 is driven in normal direction to cause the intermediate gear 38 to rotate in the direction indicated by an arrow in FIG. 16. When the recording motor 31 is driven to rotate reversely to cause the intermediate gear 38 to rotate in the direction indicated by an arrow represented by broken line in FIG. 16, the clutch spring 40a is tightened to transmit driving force to the intermediate gear 39 thereby to cause a cutter gear 41, which engages with the intermediate gear 39, to rotate in the direction indicated by an arrow represented by broken line.

The above-mentioned cutter gear 41 and the fan type actuator 43 which is connected to the pin 17e projectingly provided on the aforesaid cutter arm 17d are coupled by a link 42. Therefore, when the cutter gear 41 is rotated in the direction indicated by an arrow represented by broken line in FIG. 16, the fan type actuator 43 is also swung through the link 42 with the pivot 43a as its center in the directions b and —b. Then, the structure is arranged so that the rotational blade 17b which is connected to the aforesaid cutter arm 17d is allowed to make one reciprocal movement to perform the cutting operation for the recording sheet 14. Here, a reference numeral 44 designates a microswitch for detecting whether the above-mentioned fan type actuator 43 is returned to its home position (standby position) or not. The structure is arranged to stop the reverse rotation driving of the recording motor 31 by the detection signal from this microswitch 44.

Also, with the above-mentioned cutter gear 41, a brake gear 45 engages and as shown in FIG. 18, a one-way clutch 46 is mounted on this brake gear 45. Thus preventing the cutter gear 41 from being driven following the rotation of the aforesaid recording motor 31 when it is driven in normal direction. Also, the structure is arranged so that the clutch spring 46a is relaxed to allow free rotation when the cutter gear 41 is rotated in the direction indicated by an arrow represented by broken line in FIG. 16 when the aforesaid recording motor 31 is reversely driven.

Now, the description will be made of the operation of the above-mentioned recording driving unit. At first, when the recording operation is started, the recording motor 31 is normally driven in the direction indicated by an arrow in FIG. 16. Then, the first platen gear 34 is caused to rotate in the direction indicated by an arrow (rotational direction in clockwise). The projection 34a shown in FIG. 17 is rotated in the direction indicated by an arrow a to abut the cut-off end 35c of the projection 35a and rotated integrally with the second platen gear 35. Then, the platen roller 15 is caused to rotated in the same direction to feed the recording sheet 14 toward the down stream side.

Also, at the same time, the decurl gear 37 is caused to rotate in the direction indicated by an arrow (rotational direction in clockwise) through the intermediate gear 36 to allow the arm 27d, which holds the decurl shaft 27a, to rotated in the direction indicated by an arrow c around the rotational shaft 27c. Then, the recording sheet 14 is caused to abut the decurl shaft 27a which guides it curvedly in the direction opposite to its curling direction. Thus feeding the recording sheet while correcting its curling behaivior.

Also, at the same time, while the intermediate gear 38 which engages with the first platen gear 34 rotates in the direction indicated by an arrow (counter-clockwise direction), the one way clutch 40 does not allow any driving force to be transmitted to the intermediate gear 39. As a result, the cutter 17 is not driven and is at rest.

Subsequently, when the recording for a one page portion on the recording sheet 14 is terminated, the aforesaid recording motor 31 is rotated in the direction opposite to the one indicated by an arrow as shown in FIG. 15, so that the first platen gear 34 is caused to rotate in the direction opposite to the one indicated by an arrow (counter-clockwise direction). At this juncture, the above-mentioned first platen gear 34 rotates in the direction indicated by an arrow —a shown in FIG. 17, and no driving force is transmitted to the second platen gear 35 while the projection 34a is caused to travel the cut-off portion 35b'. Any driving force is not transmitted to the arm 27d which supports the decurl shaft 27a, either.

Figure 16:
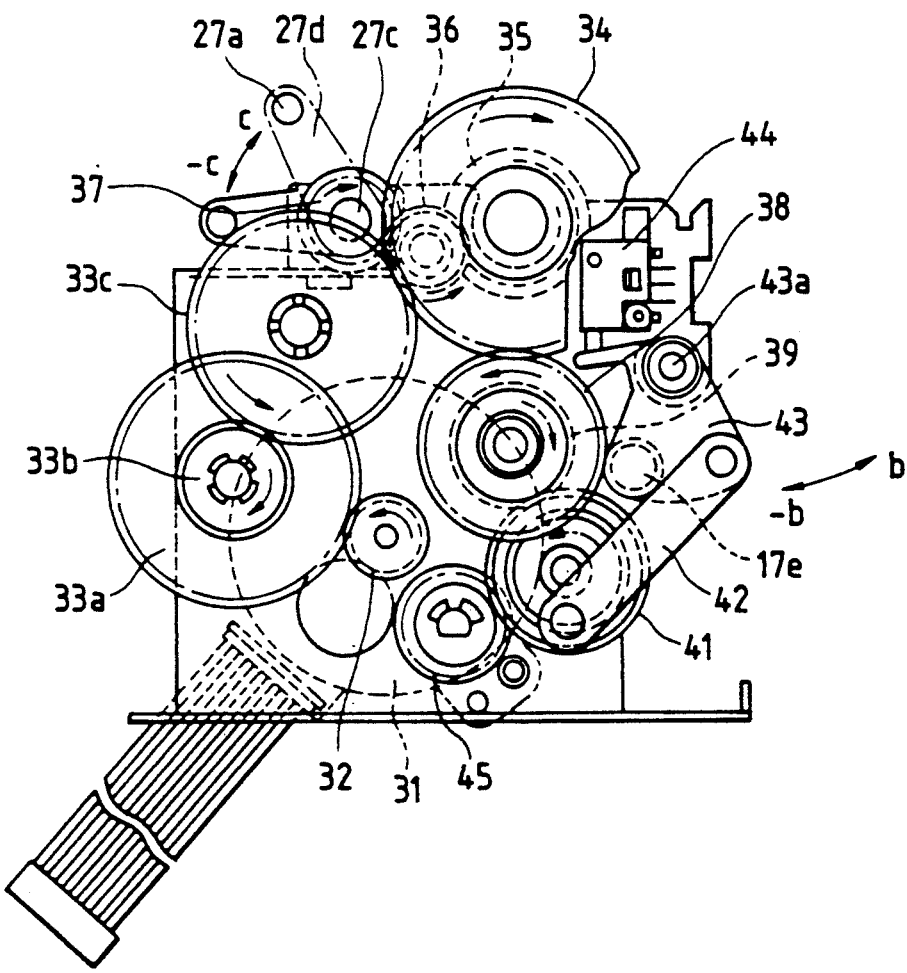
FIG. 16 is a view illustrating a recording driving unit.

While the projection 34a of the above-mentioned first platen gear 34 is rotated to travel the cut-off portion 35b in the direction —a, the intermediate gear 38a which engages with the first platen gear 34 rotates in the direction opposite to the one indicated by an arrow shown in FIG. 16 (clockwise direction) and at the same time, the driving force is transmitted to the intermediate gear 39 through the one way clutch 40 to cause it to be rotated in the direction indicated by an arrow represented by broken line (clockwise direction) in FIG. 16. At this juncture, the brake gear 45 is freely rotated with respect to the one way clutch 46 and the cutter gear 41 rotates in the direction indicated by an arrow represented by broken line (counter-clockwise direction) to allow the fan type actuator 43 in the direction indicated by an arrow b through the link 42. Accordingly, the cutter arm 17d is rotated in the direction to allow the rotational blade 17b to overlap with the fixed blade 17a. Thus, the recording sheet 14 is cut (advancing path).

Subsequently, when the projection 34a of the above-mentioned first platen gear 34 abuts the cut-off end 35d of the projection 35a shown in FIG. 17, the second platen gear 35 rotates together with the first platen gear 34 in the direction opposite to the one indicated by an arrow (counter-clockwise direction). At this juncture, the intermediate gear 36 which engages with the second platen gear 35, and the decurl gear 37 which engages with the intermediate gear 36 are driven to rotate respectively in the direction indicated by an arrow and the direction opposite thereto. Then, the arm 27d which supports the decurl shaft 27a rotates around the rotational shaft 27c in the direction indicated by an arrow —c in FIG. 16 apart from the recording sheet 14 and returns to the standby position.

Also, simultaneously, when the cutter 17 has cut the recording sheet 14 with the rotational blade 17b, the aforesaid cutter gear 41 is caused by a further reverse driving of the aforesaid recording motor 31 to rotate in the direction indicated by an arrow represented by broken line in FIG. 16 (counterclockwise direction) thereby to allow the fan type actuator 43 to rotate in the direction indicated by an arrow —b through the link 42. Thus, rotating the cutter arm 17d in the direction to parting the rotational blade 17b from the fixed blade 17a so as to return the rotational blade 17b to the standby position for cutting (returning path). When the above-mentioned rotational blade 17b is returned to the standby position for cutting, the fan type actuator 43 causes the microswitch 44 to be turned on to stop the reverse driving of the recording motor 31.

In this case, the structure is arranged so that the leading end of the recording sheet 14 thus cut is carried reversely by the reverse driving of the platen roller 15 to the recording starting position which is on the down stream side of the pressing portion of the platen roller 15 with respect to the recording head 16a, thus the recording being in its standby state.

According to the structure described above, the cutter 17 is driven by the recording motor 31 which drives the platen roller 15 to feed the recording sheet 14, and there is no need for any magnetic clutch which is used in the conventional art when the retracting operation of the recording sheet 14 and the cutting operation of the cutter 17 are performed by the reverse driving of the recording motor 31. Accordingly, it is possible to simplify the control of each member.

Also, it becomes possible to drive the platen roller 15 for feeding the recording sheet 14, cutter 17, and decurl shaft 27a by one recording motor 31. Hence enabling the reduction of the number of parts for the implementation of a lower cost manufacturing.

Furthermore, if a jamming of the recording sheet takes place in the location of the platen roller 15 or cutter 17, the rotation of the platen roller 14 and operation of the cutter 17 can be performed simultaneously by handling to rotate the jam releasing lever 29 which is mounted on the end portion of the rotational shaft 15a opposite to the driving source. Therefore, it is possible to remove the jammed recording sheet 14 after cutting or remove the jammed recording sheet 14 by rotating the platen roller 15 while keeping the edge of the cutter 17 at a released position. Hence operating the jam recovery process with easy while securing the safety of the apparatus.

In this respect, a thermo-sensitive recording method is exemplified as recording means in the aforesaid embodiment. However, the recording means is not necessarily limited thereto, and it may be possible to adopt a thermal transfer recording method or other recording methods using an ink sheet.

As described earlier, according to the present invention, the first housing serves dually as an upper guide plane when an original is being fed while the upper face of the second housing serves dually as a lower gudie plane when the original is fed. Thus, there is no need for any guide member separately provided for feeding an original, and the number of parts can be reduced. Also, it is unnecessary to perform assembling per unit with the result that the apparatus can be assembled more efficiently.

Also, the feeding path for original is arranged between the first housing and the second housing. It is therefore possible for its user to change operation units as required by replacing the aforesaid first housings.

Furthermore, the aforesaid first housing is arranged in parallel with the upper face of the second housing to correct the deflection of an original.

What is claimed is:

1. A facsimile apparatus including the following:
    a first housing as an upper cover;
    a second housing as a lower cover, said second housing forming the main body of an apparatus together with said first housing to enable said first housing to be opened and closed;
    an original reading unit for reading an original, said original reading unit being provided in said first housing and second housing;
    a recording unit for performing recording on a recording medium, said recording unit being provided in said first housing and second housing;
    an original feeding path for carrying an original to said original reading unit, said original feeding path having the upper and lower guiding planes for feeding an original, and the upper guiding plane being formed on said first housing and the lower guiding plane being formed on said second housing; and
    a feeding path for carrying a recording medium to said recording unit, said feeding path being provided in said first housing and second housing.

2. A facsimile apparatus according to claim 1, wherein
    said first housing has an original inlet for inserting an original and an original outlet for exhausting the original.

3. A facsimile apparatus including the following:
    a first housing as an upper cover, said first housing having an original inlet for inserting an original and an original outlet for exhausting the original;
    a second housing as a lower cover, said second housing forming the main body of an apparatus together with said first housing to enable said first housing to be opened and closed;
    an original reading unit for reading an original, said original reading unit being provided in said first housing and second housing; and
    an original feeding path for carrying an original to said original reading unit, said original feeding path having the upper and lower guiding planes for feeding an original, and the upper guiding plane being formed on said first housing and the lower guiding plane being formed on said second housing.

* * * * *

UNITED STATES PATENT AND TRADEMARK OFFICE
CERTIFICATE OF CORRECTION

PATENT NO. : 5,325,214
DATED : June 28, 1994
INVENTOR(S) : KAZUYA IJUIN, ET AL.

It is certified that error appears in the above-indentified patent and that said Letters Patent is hereby corrected as shown below:

COLUMN 2

Line 57, "C)" should read --C).--.

COLUMN 4

Line 65, "4. Thus" should read --4, thus--.

COLUMN 6

Line 11, "unit," should read --unit--.

COLUMN 8

Line 25, "☐" should read --]--.

COLUMN 9

Line 37, "the" (first occurrence) should be deleted.

COLUMN 10

Line 30, "driving" should read --Driving--.

COLUMN 12

Line 5, "to" should read --to be--.
Line 12, "to" should read --to be--.

UNITED STATES PATENT AND TRADEMARK OFFICE
CERTIFICATE OF CORRECTION

PATENT NO. : 5,325,214
DATED : June 28, 1994
INVENTOR(S) : KAZUYA IJUIN, ET AL.

It is certified that error appears in the above-identified patent and that said Letters Patent is hereby corrected as shown below:

COLUMN 13

Line 52, "easy" should read --ease--.

COLUMN 14

Line 1, "gudie" should read --guide--.

Signed and Sealed this

Seventh Day of February, 1995

Attest:

BRUCE LEHMAN

Attesting Officer

Commissioner of Patents and Trademarks